(12) United States Patent
Qian et al.

(10) Patent No.: US 11,449,016 B2
(45) Date of Patent: Sep. 20, 2022

(54) ACTION CONTROL METHOD AND APPARATUS

(71) Applicant: Huawei Technologies Co., Ltd., Shenzhen (CN)

(72) Inventors: Jun Qian, Beijing (CN); Xinyu Wang, Beijing (CN); Chen Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 288 days.

(21) Appl. No.: 16/906,863

(22) Filed: Jun. 19, 2020

(65) Prior Publication Data

US 2020/0319609 A1 Oct. 8, 2020

Related U.S. Application Data

(63) Continuation of application No. PCT/CN2018/121519, filed on Dec. 17, 2018.

(30) Foreign Application Priority Data

Dec. 22, 2017 (CN) .......................... 201711408965.4

(51) Int. Cl.
*G05B 13/04* (2006.01)
*G05B 13/02* (2006.01)
(Continued)

(52) U.S. Cl.
CPC ......... *G05B 13/04* (2013.01); *G05B 13/0275* (2013.01); *G06K 9/6228* (2013.01);
(Continued)

(58) Field of Classification Search
None
See application file for complete search history.

(56) References Cited

U.S. PATENT DOCUMENTS 5,796,919 A * 8/1998 Kubica .............. G05B 13/0275
706/900
6,169,981 B1 * 1/2001 Werbos .............. G05B 13/0285
706/26
(Continued)

FOREIGN PATENT DOCUMENTS

CN 101414159 A 4/2009
CN 102207928 A 10/2011
(Continued)

OTHER PUBLICATIONS

Bonarini, A, et al., "Reinforcement distribution in fuzzy Q-learning," Fuzzy Sets and Systems, Elsevier, Amsterdam, NL, vol. 160, No. 10, May 16, 2009, pp. 1420-1443, XP026070732.
(Continued)

*Primary Examiner* — Anand P Bhatnagar
(74) *Attorney, Agent, or Firm* — Conley Rose, P.C.

(57) ABSTRACT

An action control method and apparatus related to the field of artificial intelligence, where the method includes obtaining states of N dimensions of an artificial intelligence device, obtaining a plurality of discrete decisions based on an active fuzzy subset and a control model that are of a state of each of the N dimensions, where an active fuzzy subset of a state is a fuzzy subset whose membership degree of the state is not zero, the membership degree is used to indicate a degree that the state belongs to the fuzzy subset, performing, based on a membership degree between a state and an active fuzzy subset that are of each dimension, weighted summation on the plurality of discrete decisions, to obtain a continuous decision, and controlling, based on the continuous decision, the artificial intelligence device to execute a corresponding action.

20 Claims, 6 Drawing Sheets

(51) Int. Cl.
  *G06K 9/62* (2022.01)
  *G06N 7/02* (2006.01)
(52) U.S. Cl.
  CPC ......... *G06K 9/6261* (2013.01); *G06K 9/6289* (2013.01); *G06N 7/023* (2013.01)

(56) References Cited

U.S. PATENT DOCUMENTS

| | | | | |
|---|---|---|---|---|
| 6,581,048 | B1* | 6/2003 | Werbos | G06N 3/105 |
| | | | | 250/369 |
| 6,917,925 | B2* | 7/2005 | Berenji | G06N 7/023 |
| | | | | 706/5 |
| 8,357,094 | B2* | 1/2013 | Mo | A61B 8/00 |
| | | | | 600/407 |
| 9,171,261 | B1* | 10/2015 | Zadeh | G06F 40/40 |
| 11,200,448 | B2* | 12/2021 | Hartmann | G06K 9/6218 |
| 2010/0189329 | A1* | 7/2010 | Mo | A61B 8/585 |
| | | | | 600/443 |
| 2012/0095338 | A1* | 4/2012 | Mo | A61B 8/00 |
| | | | | 600/443 |
| 2016/0082965 | A1* | 3/2016 | Jeon | B60W 50/10 |
| | | | | 701/36 |
| 2017/0235848 | A1* | 8/2017 | Van Dusen | G06N 5/02 |
| | | | | 705/12 |

FOREIGN PATENT DOCUMENTS

| | | |
|---|---|---|
| CN | 103645635 A | 3/2014 |
| CN | 103955930 A | 7/2014 |
| CN | 104240522 A | 12/2014 |
| CN | 105438181 A | 3/2016 |
| CN | 105501078 A | 4/2016 |
| CN | 105549384 A | 5/2016 |
| CN | 105956968 A | 9/2016 |
| CN | 106874668 A | 6/2017 |
| CN | 107053179 A | 8/2017 |
| CN | 107099785 A | 8/2017 |
| EP | 2933069 A1 | 10/2015 |

OTHER PUBLICATIONS

Dong-Hyun Lee, et al., "Q-learning using fuzzified states and weighted actions and its application to omni-direnctional mobile robot control," Computational Intelligence in Robotics and Automation (CIRA), 2009 IEEE International Symposium On, IEEE, Piscataway, NJ, USA, Dec. 15, 2009, pp. 102-107, XP031643855.

Busoniu, L., et al. "Continuous-State Reinforcement Learning with Fuzzy Approximation," 2008, Adaptive Agents and Multi-Agent Systems III. Adaptation and Multi-Agent Learning; [Lecture Notes in Computer Science], Springer-Verlag, Berlin, Heidelberg, pp. 27-43, 2008, XP019086617.

Chen, C., et al. "Deepdriving: Learning Affordance for Direct Perception in Autonomous Driving," IEEE International Conference on Computer Vision, 2015, pp. 2722-2730.

Gindele, T., et al,. "Learning Driver Behavior Models from Traffic Observations for Decision Making and Planning," IEEE Intelligent Transportation Systems Magazine, 2015, 7(1), pp. 69-79.

Bojarski, M., et al. "End to End Learning for Self-driving Cars," arXiv:1604.07316v1 [cs.CV], Apr. 25, 2016, 9 pages.

* cited by examiner

ACTION CONTROL METHOD AND APPARATUS

CROSS-REFERENCE TO RELATED APPLICATIONS

This application is a continuation of International Patent Application No. PCT/CN2018/121519 filed on Dec. 17, 2018, which claims priority to Chinese Patent Application No. 201711408965.4 filed on Dec. 22, 2017. The disclosures of the aforementioned applications are hereby incorporated by reference in their entireties.

TECHNICAL FIELD

The present disclosure relates to the field of artificial intelligence, and in particular, to an action control method and apparatus.

BACKGROUND

With development of the field of artificial intelligence, various artificial intelligence devices such as an unmanned vehicle and a robot have emerged, thereby bringing convenience to people's life. Currently, an artificial intelligence method is usually used to provide an intelligent decision to an artificial intelligence device, and serves as a machine brain of the artificial intelligence device, to control the artificial intelligence device to execute a corresponding action. For example, the artificial intelligence method may be used to control the unmanned vehicle to run on a road, or may control the robot to move in a warehouse.

Currently, a reinforcement learning algorithm is usually used to control an action of an artificial intelligence device. An unmanned vehicle is used as an example. Necessary elements in the reinforcement learning algorithm are first defined based on an actual application scenario N-dimensional state space S, m-dimensional action space A, and a reward function R, simulation driving of the unmanned vehicle is performed, based on the N-dimensional state space S, the m-dimensional action space A, and the reward function R, in a simulator environment or driving on a real road, to train a control model, based on an N-dimension state in input N-dimensional state space S, the control model is used to output m-dimensional discrete decisions in the m-dimensional action space A. Then, in an actual driving process, the unmanned vehicle collects a current N-dimensional state and inputs the N-dimensional state into the control model, to obtain an m-dimensional discrete decision output by the control model, and control, based on the m-dimensional discrete decision, to execute a corresponding action.

However, the following problem exists.

When an artificial intelligence device is controlled, based on a discrete decision, to execute an action, a decision output by the artificial intelligence device is a discrete magnitude, and it is difficult to ensure smooth control over the artificial intelligence device, and consequently, smoothness of the action is poor.

SUMMARY

Embodiments of the present disclosure provide an action control method and apparatus, to resolve a technical problem that it is difficult to ensure smooth control over an artificial intelligence device. The technical solutions are as follows.

According to a first aspect, an action control method is provided, and the method includes obtaining states of N dimensions of an artificial intelligence device, where N is a positive integer that is greater than or equal to one, obtaining a plurality of discrete decisions based on an active fuzzy subset and a control model that are of a state of each of the N dimensions, where an active fuzzy subset of a state is a fuzzy subset whose membership degree of the state is not zero, each fuzzy subset is a state interval that corresponds to a same discrete decision in a dimension, the membership degree is used to indicate a degree that the state belongs to the fuzzy subset, and the control model is used to output a corresponding discrete decision based on an input state, performing, based on a membership degree between a state and an active fuzzy subset that are of each dimension, weighted summation on the plurality of discrete decisions, to obtain a continuous decision, and controlling, based on the continuous decision, the artificial intelligence device to execute a corresponding action.

According to the method provided in this embodiment, weighted summation is performed, based on a membership degree between a state and an active fuzzy subset that are of each dimension, on the plurality of discrete decisions, to obtain a continuous decision. Because an output decision is a continuous quantity, smooth control over the artificial intelligence device can be ensured, thereby ensuring smoothness of the action. In addition, a continuous decision is obtained using a membership degree, and a manner of properly and continuously discretizing a decision is provided, thereby ensuring that a change trend of the continuous decision matches that of a state, and ensuring that the continuous decision is highly accurate. Further, when the artificial intelligence device is an unmanned vehicle, control smoothness of the unmanned vehicle can be ensured such that passengers feel more comfortable.

In a possible design, performing, based on a membership degree between a state and an active fuzzy subset that are of each dimension, weighted summation on the plurality of discrete decisions, to obtain a continuous decision includes obtaining, for each of the plurality of discrete decisions, membership degrees of N active fuzzy subsets corresponding to each discrete decision, to obtain N membership degrees, calculating, based on the N membership degrees, weights of the discrete decisions, and performing, based on the weights of the discrete decisions, weighted summation on the plurality of discrete decisions, to obtain the continuous decision.

In a possible design, obtaining a plurality of discrete decisions based on an active fuzzy subset and a control model that are of a state of each of the N dimensions includes obtaining a central value of an active fuzzy subset of each of the N dimensions, to obtain a plurality of central values, combining central values of different dimensions to obtain a plurality of intermediate states, where each intermediate state includes central values of the N dimensions, and respectively inputting the plurality of intermediate states into the control model to obtain the plurality of discrete decisions output by the control model.

In a possible design, before obtaining a plurality of discrete decisions based on an active fuzzy subset and a control model that are of a state of each of the N dimensions, the method further includes setting, for each of the N dimensions, each fuzzy subset as an active fuzzy subset of each dimension when a membership degree between a state and any fuzzy subset that are of each dimension is not zero, or selecting, for each of the N dimensions, from a plurality of fuzzy subsets of each dimension, two fuzzy subsets as active fuzzy subsets of each dimension, where central values of the two fuzzy subsets are around the state of each dimension.

In a possible design, before obtaining states of N dimensions of an artificial intelligence device, the method further includes dividing, for each of the N dimensions, state space of each dimension into a plurality of state intervals, obtaining, based on the control model, a typical discrete decision of each of the plurality of state intervals, to obtain a plurality of typical discrete decisions, and combining, based on the plurality of typical discrete decisions, a plurality of adjacent state intervals corresponding to a same typical discrete decision into a fuzzy subset, to obtain at least one fuzzy subset of each dimension.

This design provides a manner of automatically obtaining a fuzzy subset through division using a control model that is obtained through training based on reinforcement learning. The manner does not need to depend on artificial making of a decision, and therefore, the manner is highly efficient. Further, in an over-partitioning manner, each state space may be divided into a large quantity of state intervals, and when a fuzzy subset is obtained through combination based on a typical discrete decision of a large quantity of state intervals, because a boundary of the fuzzy subset is very accurate, relatively high accuracy of the fuzzy subset can be ensured. Further, the manner is applicable to a scenario in which the high-dimensional state space is divided into fuzzy subsets, and a fuzzy subset may be conveniently and quickly extended to the high-dimensional space. Therefore, the manner is applied to a complex running situation in actual application and is highly practical.

In a possible design, obtaining, based on the control model, a typical discrete decision of each of the plurality of state intervals includes obtaining, for each of the plurality of state intervals, a plurality of representative states of each state interval, where each representative state includes a central value of each state interval of each dimension and any one of other states of each dimension, respectively inputting the plurality of representative states into the control model to obtain the plurality of discrete decisions output by the control model, and selecting, from the plurality of discrete decisions, a discrete decision with a maximum quantity of repetitions as the typical discrete decision of each state interval.

In a possible design, after obtaining states of N dimensions of an artificial intelligence device, the method further includes calculating, for each fuzzy subset of each of the N dimensions, a state of each dimension using a membership function corresponding to each fuzzy subset, to obtain a membership degree of each fuzzy subset.

In a possible design, before obtaining states of N dimensions of an artificial intelligence device, the method further includes obtaining, based on a preset rule, the membership function of each fuzzy subset, where the membership function is used to calculate a membership degree of a corresponding fuzzy subset, and the preset rule is that a central value of the membership function in each fuzzy subset is set to one, a membership degree of a boundary value in each fuzzy subset is set to 0.5, and a central value of two adjacent fuzzy subsets in all the fuzzy subsets is set to zero.

Based on this design, the membership function is highly explanatory and more effective. In addition, steps of the membership function are simple, thereby improving efficiency of constructing the membership function.

According to a second aspect, an action control apparatus is provided, where the apparatus includes a plurality of function modules, to implement the action control method in any one of the first aspect and possible designs of the first aspect.

According to a third aspect, an artificial intelligence device is provided, and the artificial intelligence device includes a processor and a memory, the memory stores at least one instruction, and the instruction is loaded and executed by the processor to implement the action control method in any one of the first aspect and possible designs of the first aspect.

According to a fourth aspect, a computer readable storage medium is provided, and the storage medium stores at least one instruction, and the instruction is loaded and executed by a processor to implement the action control method in any one of the first aspect and possible designs of the first aspect.

DESCRIPTION OF EMBODIMENTS

Figure 1:
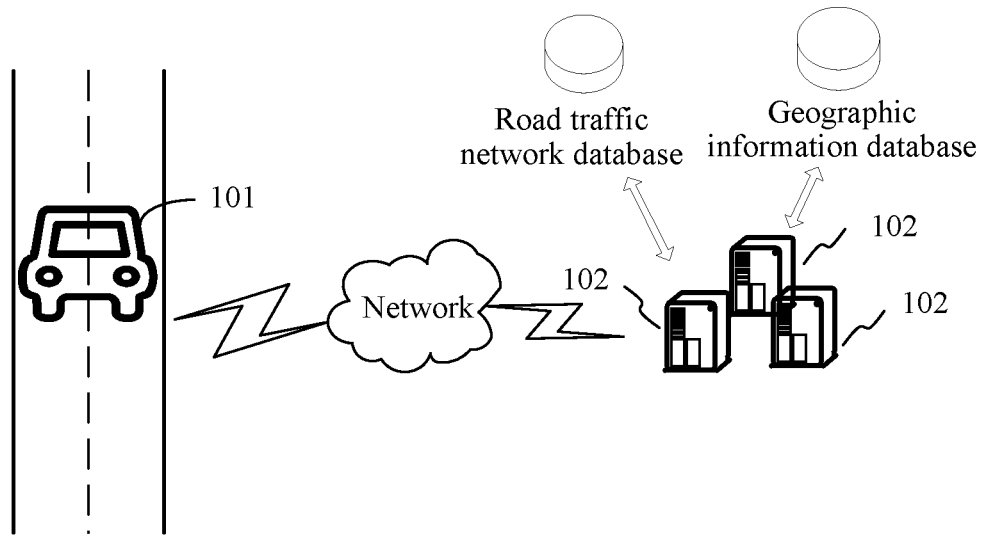
FIG. 1 is a schematic diagram of an implementation environment according to an embodiment of the present disclosure.

To make the objectives, technical solutions, and advantages of this disclosure clearer, the following further describes the implementations of this disclosure in detail with reference to the accompanying drawings.

For ease of understanding, the following explains terms in embodiments of the present disclosure.

State space is a set of all possible states of an artificial intelligence device. The state space may include N dimensions (n is a positive integer). A dimension of the state space may be a speed dimension, an angle dimension, a distance dimension, or the like. A state of the artificial intelligence device at any moment may be represented using an N-dimensional vector in the state space.

Action space is a set of all executable actions of an artificial intelligence device. The action space may include m dimensions (m is a positive integer), for example, a throttle dimension, a steering angle dimension, and a brake dimension. Actions of the artificial intelligence device at any moment may be represented using an m-dimensional vector in the action space.

A reward function is a function that uses a state as an input and uses a reward value as an output. A larger reward value indicates that a corresponding state is more ideal, and a negative reward value indicates that a corresponding state is not ideal.

Reinforcement learning is also referred to as evaluation learning, and is learning that maximizes a reward value to be a goal and that is mapped from environment to a behavior. In the reinforcement learning, the actions are evaluated using the reward value. During training, a control model needs to learn from its own experience, obtain knowledge in an action-evaluation environment, and continuously improve the actions to adapt to the environment.

A fuzzy subset is also referred to as a fuzzy set, and is a set that expresses a fuzzy concept. A membership relationship between any state and a fuzzy subset is not absolutely positive or negative, but a degree of a membership relationship is represented using a membership degree. In the embodiments of the present disclosure, the fuzzy subset is a state interval that corresponds to a same discrete decision in a dimension, to be specific, discrete decisions corresponding to all states in the fuzzy subset are the same.

Membership degree and membership function: If any element x in a field U corresponds to a number $A(x) \in [0, 1]$, A is referred to as a fuzzy set in the field U, and $A(x)$ is referred to as the membership degree of x to A. When x changes in the field U, $A(x)$ is a function and referred to as a membership function of A. The membership degree $A(x)$ closer to one indicates a higher degree that x belongs to A, the membership degree $A(x)$ closer to zero indicates a lower degree that x belongs to A, and the membership function $A(x)$ with a value interval $(0, 1)$ may be used to represent a degree that x belongs to A. In the embodiments of the present disclosure, a membership degree is used to indicate a degree that a state belongs to a fuzzy subset, a higher membership degree indicates a higher degree that a state belongs to a fuzzy subset, it may be considered that the state strongly belongs to the fuzzy subset, a lower membership degree indicates a lower degree that a state belongs to a fuzzy subset, and it may be considered that the state weakly belongs to the fuzzy subset.

Active fuzzy subset: When a membership degree between a state and a fuzzy subset is not zero, it may be understood that the fuzzy subset is active, and the fuzzy subset is the active fuzzy subset.

FIG. 1 is a schematic diagram of an implementation environment according to an embodiment of the present disclosure. The implementation environment includes an artificial intelligence device 101 and a plurality of servers 102. The artificial intelligence device 101 is connected to the plurality of servers 102 using a wireless network or a wired network. The artificial intelligence device 101 may be an unmanned vehicle or a robot. Each server 102 may be a server, a server cluster including several servers, or a cloud computing service center.

When a control model is trained through reinforcement learning, a state used by the artificial intelligence device during training may be from the server 102, and the artificial intelligence device may perceive states of all dimensions, to perform learning. The unmanned vehicle is used as an example. The server may provide, to the unmanned vehicle, current location information of the unmanned vehicle and information about a road on which the unmanned vehicle is running such that the unmanned vehicle learns the location of the unmanned vehicle and the information about the road on which the unmanned vehicle is running. When the control model is actually used, a state obtained by the artificial intelligence device may also be from the server, and the artificial intelligence device may make a corresponding decision based on the obtained state and the control model, to execute a corresponding action. Optionally, the server 102 may further include at least one database, such as a road traffic network database or a geographic information database, and the server 102 is configured to provide a state of each dimension to the artificial intelligence device 101.

An action control method provided in this embodiment may be applied to a plurality of actual application scenarios. The following describes the action control method with reference to two example application scenarios.

Figure 2:
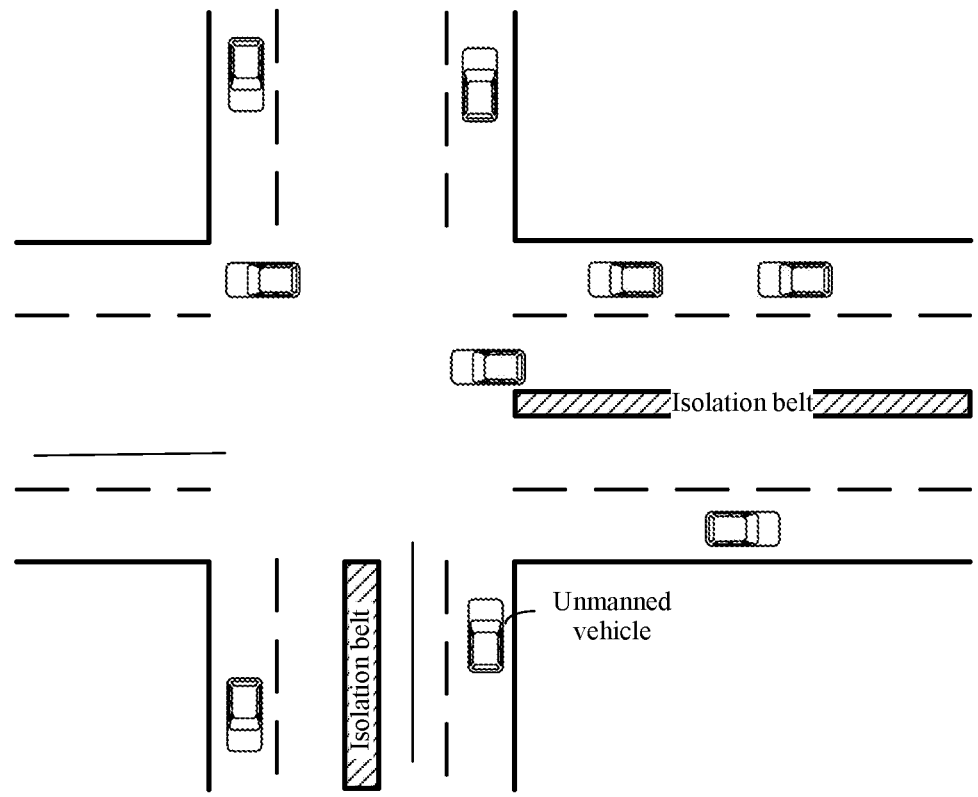
FIG. 2 is a schematic diagram of an application scenario according to an embodiment of the present disclosure.

(1) The action control method may be applied to a scenario in which an unmanned vehicle performs unmanned driving. Referring to FIG. 2, in a driving process, a continuous decision may be output using states of various dimensions such as a current speed, a distance between the unmanned vehicle and a central axis of a road, and current road traffic, and a control model. The continuous decision may be a steering angle, acceleration, a throttle size, a brake force, or the like. Smoothness of an action of the unmanned vehicle can be ensured using the continuous decision, to avoid causing a situation such as fluctuation in speed such that passengers feel more comfortable. Further, an output continuous decision may be bottom-layer data, to be specific, the continuous decision may be refined to data such as a left turning angle and an acceleration value to perform high-precision control such that the unmanned vehicle can perform high-difficulty actions such as running straight along a road axis, lane changing, overtaking, vehicle following, and vehicle parking, thereby implementing a task of automatically driving the unmanned vehicle.

(2) The action control method may be applied to a scenario in which a robot performs a task. An embodiment of the present disclosure may be applied to a scenario in which a warehousing robot transports a cargo at various locations such as a warehouse or a construction site, a weeding robot performs weeding on a lawn, a vacuum cleaning robot performs cleaning in an office, a harvesting robot harvests crops in a farmland, and a go-playing robot plays the game of go. For example, the warehousing robot transports a cargo in a warehouse, in a running process, the warehousing robot may obtain states such as a current speed, a current location, a distance between the warehousing robot and a neighboring shelf, and a distance between the warehousing robot and a shelf to which the cargo is placed, and a control model, to output a continuous decision. The continuous decision may be picking up a commodity, hand raising, placing the cargo in a storage basket, a steering angle, acceleration, or the like. Smoothness of an action of the robot can be ensured using the continuous decision, to avoid a situation in which a robot falls down due to a large fluctuation between actions of the robot. Further, the output continuous decision may be bottom-layer data, to be specific, the continuous decision may be refined to data such as a speed of picking up a commodity, a left turning angle, and an acceleration value to perform high-precision control such that a robot can perform a high-difficulty action, thereby improving performance of the robot.

Figure 3:
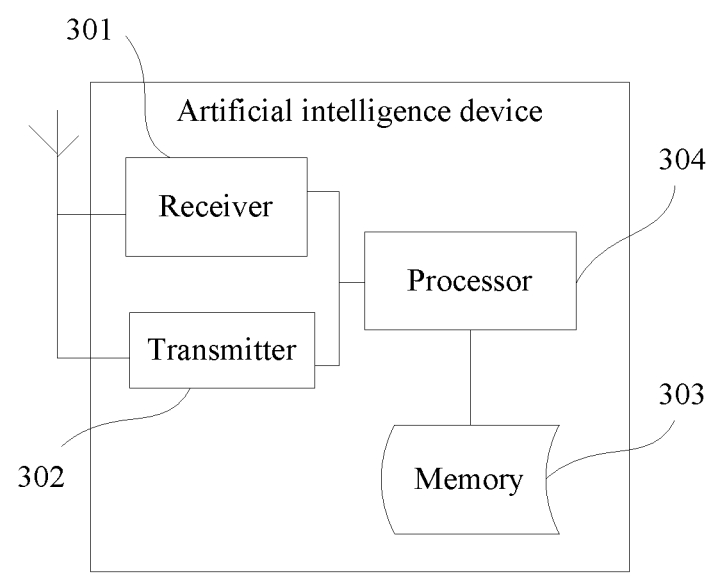
FIG. 3 is a schematic structural diagram of an artificial intelligence device according to an embodiment of the present disclosure.

FIG. 3 is a schematic structural diagram of an artificial intelligence device according to an embodiment of the present disclosure. Referring to FIG. 3, the artificial intelligence device includes a receiver 301, a transmitter 302, a memory 303, and a processor 304, where the receiver 301, the transmitter 302, and the memory 303 are separately connected to the processor 304, the memory 303 stores program code, and the processor 304 is configured to invoke the program code to perform an operation performed by the artificial intelligence device in the following embodiments.

In an example embodiment, a computer readable storage medium is further provided, for example, a memory including an instruction, and the instruction may be executed by a processor in an electronic device to complete an action control method in the following embodiments. For example, the computer readable storage medium may be a read-only memory (ROM), a random-access memory (RAM), a compact disc (CD) ROM (CD-ROM), a magnetic tape, a FLOPPY DISK, or an optical data storage device.

An embodiment of the present disclosure provides an action control method. The method mainly includes three parts. A first part is a reinforcement learning process. For details, refer to the following steps 401 to 402 in which a control model that uses an input as a state and uses an output as a discrete decision can be obtained in the reinforcement learning process. A second part is a spatial fuzzification process. For details, refer to the following steps 403 to 406. Each dimension of the state space may be divided into a plurality of fuzzy subsets in the spatial fuzzification process, and a membership function of each fuzzy subset can be obtained. A third part is a defuzzification process. For details, refer to the following steps 407 to 410 in which a continuous decision is calculated, in an online control process, based on a fuzzy subset of an actual state and a membership function in order to control an artificial intelligence device to execute a corresponding action. According to the method provided in this embodiment of the present disclosure, the artificial intelligence device is controlled to execute an action based on the continuous decision, to ensure smooth control over the artificial intelligence device, and ensure smoothness of the action.

Figure 4A:
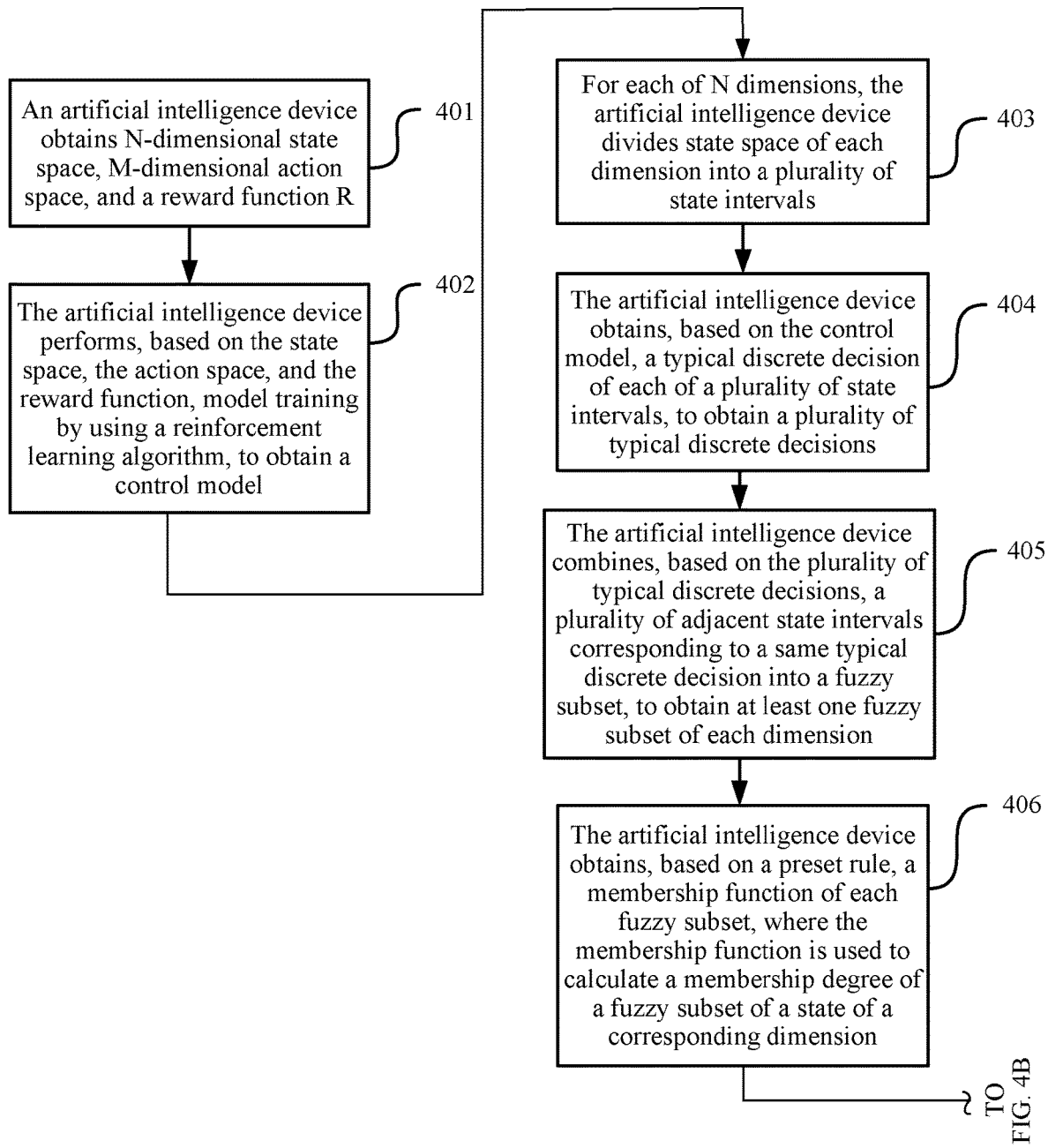
FIG. 4A and FIG. 4B are a flowchart of an action control method according to an embodiment of the present disclosure.
Figure 4B:
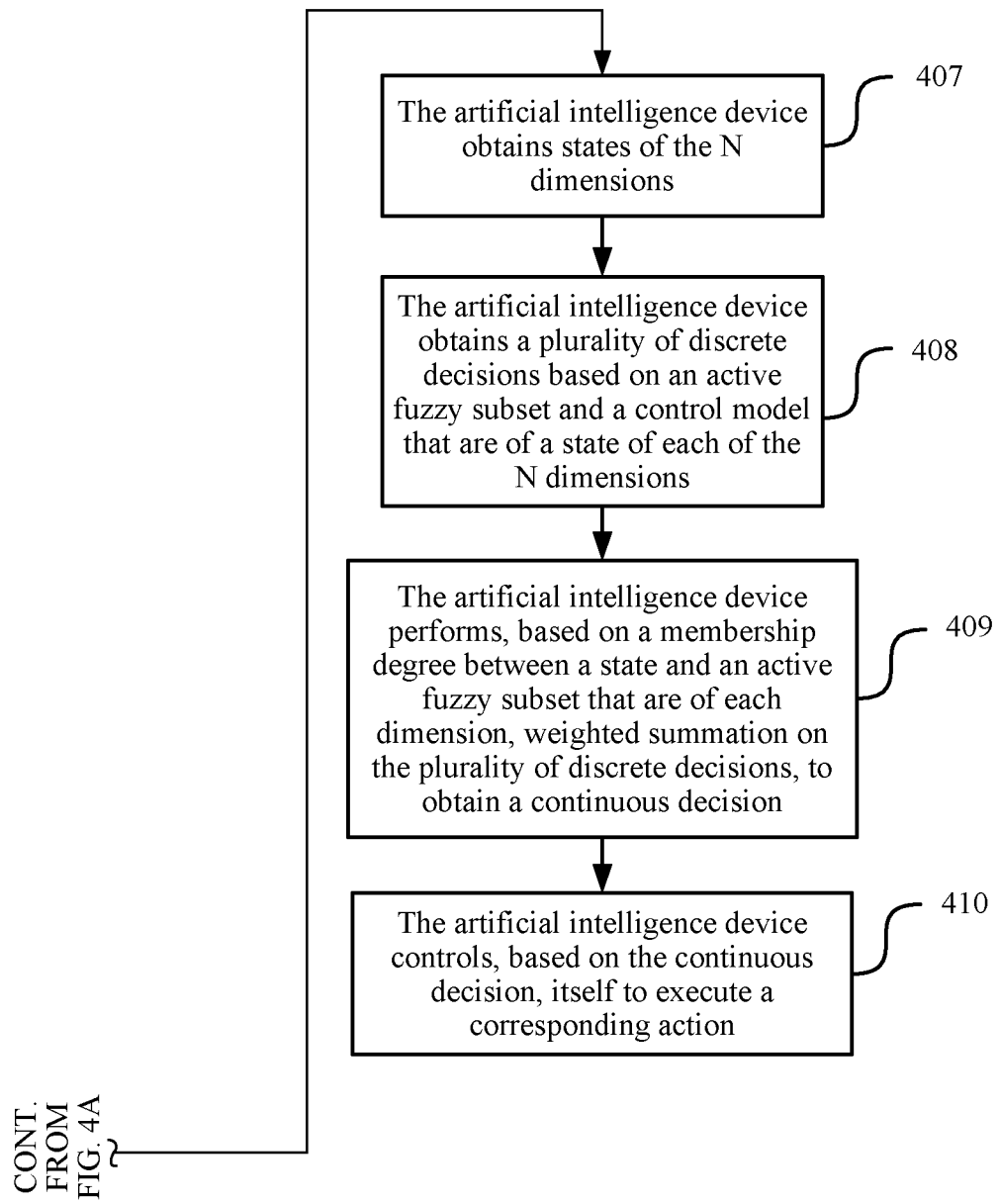

FIG. 4A and FIG. 4B are a schematic diagram of an action control method according to an embodiment of the present disclosure. The method is performed by an artificial intelligence device. As shown in FIG. 4A and FIG. 4B, the method includes the following steps.

Step 401. The artificial intelligence device obtains N-dimensional state space S, M-dimensional action space A, and a reward function R, where N is a positive integer that is greater than or equal to one, and M is also a positive integer that is greater than or equal to one.

In a subsequent process, the state space, the action space, and the reward function are used as inputs, various discrete decisions are used as outputs, and a training model is constructed based on a reinforcement learning algorithm. In step 401, the artificial intelligence device obtains the state space, the action space, and the reward function in advance in order to define necessary elements of the reinforcement learning algorithm. For example, the state space is represented by S, the action space is represented by A, and the reward function is represented by R. Step 401 may include the following steps 1 to 3.

Step 1: The Artificial Intelligent Device Generates N-Dimensional State Space S.

Concept and design of state space of each dimension: The state space of each dimension is a set of states of a corresponding dimension of the artificial intelligence device, the state space of each dimension may be designed based on a state that can be obtained by the artificial intelligence device in a running process, to be specific, the state space of each dimension may be designed based on a state that can be collected in real time by the artificial intelligence device or a state obtained through processing. The state space of each dimension includes two boundaries: A left boundary may represent a minimum value of a state of a corresponding dimension, and a right boundary may represent a maximum value of a state of a corresponding dimension. The minimum value of the state may be directly designed as a left boundary of the state space, and the maximum value of the state may be directly designed as a right boundary of the state space. Alternatively, a minimum value and a maximum value that are of the state may be normalized, and a normalized minimum value and a normalized maximum value are respectively designed as the left boundary and the right boundary that are of the state space.

For example, the artificial intelligence device is an unmanned vehicle, state space S may include any combination of θ-dimensional state space, V-dimensional state space, P-dimensional state space, V-front-dimensional state space, V-rear-dimensional state space, P-front-dimensional state space, and P-rear-dimensional state space, θ is an included angle between a central axis of the unmanned vehicle and a central axis of a road, V is a current speed of the unmanned vehicle, P is a distance between the unmanned vehicle and the central axis of the road, V-front is a speed of a vehicle in front of the unmanned vehicle, V-rear is a speed of a vehicle in rear of the unmanned vehicle, P-front is a distance between the unmanned vehicle and the vehicle in front of the unmanned vehicle, and P-rear is a distance between the unmanned vehicle and the vehicle in rear of the unmanned vehicle. For example, the artificial intelligence device is a robot, and the state space may include state space of a speed dimension, state space of a left foot dimension, state space of a right foot dimension, and the like. This is not limited in this embodiment.

In a possible design, refer to Table 1. The unmanned vehicle may correspond to N-dimensional state space, where N is equal to three, and the unmanned vehicle includes θ-dimensional state space, V-dimensional state space, and P-dimensional state space, a boundary of the θ-dimensional state space may be −1 and 1, −1 represents −180, and 1 represents 180°. A boundary of the V-dimensional state space is within a range from zero to 300, zero represents a minimum speed, and 300 represents a maximum speed, and a boundary of the P-dimensional state space is −1 and 1, and the boundary is a result normalized using a road width. When P is equal to zero, it indicates that the unmanned vehicle is on the central axis of the road, or when P is greater than 1 or less than −1, it indicates that the unmanned vehicle has left the road.

TABLE 1

| Variable name | Explanation |
| --- | --- |
| θ | θ is an included angle between a central axis of the unmanned vehicle and a central axis of a road and is within a range from −1 to 1. |
| V | V is a speed of the unmanned vehicle and is within a range from zero to 400. |
| P | P is a distance between the unmanned vehicle and the central axis of the road and is within a range from −1 to 1. |

For a specific process of generating the N-dimensional state space 5, the artificial intelligence device may obtain a state space generation instruction, and generate N-dimensional state space based on the state space generation instruction. The state space generation instruction indicates a quantity of dimensions of state space, and may further indicate a name of the state space of each dimension and a boundary value of the state space of each dimension, and the artificial intelligence device may generate the N-dimensional state space based on the quantity of dimensions, the name of the state space of each dimension, and the boundary value of the state space of each dimension that are included in the state space generation instruction. The artificial intelligence device may obtain the state space generation instruction when running code for defining state space. The code for defining state space is written by a developer in advance based on an actual requirement, and is stored in the artificial intelligence device in advance by the developer.

Step 2: The Artificial Intelligence Device Generates the M-Dimensional Action Space A.

Concept and design of action space of each dimension: The action space of each dimension is a set of actions of a corresponding dimension of the artificial intelligence device, and the action space of each dimension may be determined based on an action that can be executed by the artificial intelligence device in an actual running process. The action space of each dimension includes two boundaries: A left boundary may represent a minimum value of an action of a corresponding dimension, and a right boundary may represent a maximum value of an action of a corresponding dimension. The minimum value of the action may be directly designed as a left boundary of the action space, and the maximum value of the action may be directly designed as a right boundary of the action space. Alternatively, a minimum value and a maximum value that are of the action may be normalized, and a normalized minimum value and a normalized maximum value are respectively designed as the left boundary and the right boundary that are of the action.

For example, the artificial intelligence device is an unmanned vehicle, and the action space A may include any combination of action space of a steering angle dimension, state space of a throttle dimension, state space of a brake dimension, and the like. For example, the artificial intelligence device is a robot, and the action space may include any combination of action space of a cleaning dimension, action space of a weeding dimension, action space of a steering angle dimension, and action space of an article transport dimension.

Each dimension corresponds to an action of a type, action space of each dimension is a set of actions of a corresponding type of the artificial intelligence device, and a boundary of action space of each dimension is determined based on a minimum value and a maximum value that are of an action of a corresponding type. For example, action space of a speed dimension is a set of running speeds of the artificial intelligence device, and a boundary of the action space of the speed dimension is determined based on a minimum speed and a maximum speed that are of the artificial intelligence device, for example, zero to 400.

For a specific process of generating the M-dimensional action space A, the artificial intelligence device may obtain an action space generation instruction, and generates the M-dimensional action space A based on the action space generation instruction. The action space generation instruction indicates a quantity of dimensions of action space, and may further indicate a name of the action space of each dimension and a boundary value of the action space of each dimension, and the artificial intelligence device may generate the M-dimensional action space based on the quantity of dimensions, the name of the action space of each dimension, and the boundary value of the action space of each dimension that are in the action space generation instruction. The artificial intelligence device may obtain the action space generation instruction when running code for defining action space. The code for defining state space is written by a developer in advance based on an actual requirement, and is stored in the artificial intelligence device in advance by the developer.

In a possible design, the artificial intelligence device may discretize the M-dimensional action space A, to be specific, q actions $\{a_i, i=1, \ldots p\}$ can be extracted, based on a specific granularity, from the action space of each dimension and used as discretized action space of the dimension. The action space of each dimension may be discretized based on a uniform granularity, or a correspondence between a granularity and a dimension of the action space may be obtained, and the action space of each dimension is discretized based on a granularity corresponding to the dimension. In addition, a specific value of the granularity may be determined based on an actual requirement. This is not limited in this embodiment.

For example, refer to Table 2. The unmanned vehicle may correspond to M-dimensional action space (action space of a steering angle dimension), where M is equal to one, the action space is within a range of $[-1, 1]$, where $-1$ represents a maximum right turning angle, 1 represents a maximum left turning angle, and zero represents running straight. The action space may be discretized based on a granularity of 0.1 to obtain $[-1, -0.9, -0.8, \ldots, 0.8, 0.9, 1]$, and a total of 21 actions constitute discretized action space of the steering angle dimension.

TABLE 2

| Variable name | Explanation |
| --- | --- |
| Steering angle | The steering angle is within a range of $[-1, 1]$, and is within a range of $[-1, -0.9, -0.8, \ldots, 0.8, 0.9, 1]$ after being discretized based on a granularity of 0.1, and a total of 21 dimensions are output. |

In this embodiment, the following technical effects can be achieved by discretizing the action space.

A convergence speed of a control model is increased to ensure that the control model is quickly trained: A design of the action space directly affects the convergence speed of the control model in a subsequent model training process, when more actions are performed in the action space, there are more actions for selection when the control model makes a decision in a state, more selections for the control model indicate a larger calculation amount, and a lower convergence speed of the control model indicates a lower speed of making a decision during online use. In a related technology, for reinforcement learning solutions of a Deep Deterministic Policy Gradient (DDPG) and other types of continuous decisions, action space designed in the solutions is continuous, and consequently, an excessive calculation amount is required during model training, and consequently, it is difficult to ensure fast convergence of the control model, and practicality of the control model is low. In this embodiment, the action space is discretized to reduce exploration space of a reinforcement learning process and a calculation amount required for training a control model, thereby increasing a convergence speed of the control model, and ensuring that the control model is quickly trained. Further, this reduces a calculation amount of making a decision using the control model online, increases a speed of making the decision, and ensures that the decision is quickly made.

Step 3: The Artificial Intelligence Device Obtains a Reward Function.

The reward function may be designed based on an expectation for a state in an actual running process of the artificial intelligence device, the reward function may be designed as an ideal state, and an output reward value is a positive number and positively related to a degree of idealness. To be specific, if a state is more ideal, the reward function outputs a higher reward value when the state is input to the reward function. In addition, the reward function may be designed as a non-ideal state, and the output reward value is a negative number, to be specific, a penalty value is output.

The following technical effects can be achieved in the foregoing manner of designing the reward function.

The control model is enabled to learn a decision corresponding to each state, to improve accuracy of the control model in decision making during use: In a subsequent model training process, perception of the control model for each state is determined using a reward value of a state determined by the reward function, and the control model makes a decision by maximizing the reward value. A negative reward value is designed in the non-ideal state, when the control model triggers this state, the negative reward value is obtained. This may be understood as being punished, and the control model perceives that the state should be avoided when during subsequent decision making. Therefore, when the control model is actually used to make the decision, an effect of presenting the non-ideal state can be avoided. A positive reward value is designed in the ideal state and positively related to the degree of idealness, when the control model triggers this state, the positive reward value is obtained. This may be understood as being encouraged, and the control model perceives that the state should be preferred during subsequent decision making. Therefore, when the control model is actually used to make the decision, an effect of inclining the ideal state can be achieved.

The unmanned vehicle is used as an example. Because an ideal state of an unmanned vehicle driving process indicates that the unmanned vehicle does not collide, the unmanned vehicle runs quickly, the unmanned vehicle runs along a road, and the like, a reward value output by the reward function may be negatively related to a collision and $\theta$, and may be positively related to a speed. For example, the reward function may be designed as $R=V \cos \theta - V \sin \theta$ when the unmanned vehicle does not collide, or when the unmanned vehicle collides, $R=-200$.

Based on the reward function, the control model is punished when a collision occurs during training, thereby urging the control model to output the decision to avoid the collision. Because a higher speed indicates a greater reward, the control model can be encouraged to output the decision to increase a speed, thereby ensuring that the unmanned vehicle runs as quickly as possible. Because a smaller $\theta$ indicates a greater reward, the control model can be encouraged to output the decision to reduce $\theta$, thereby ensuring that the unmanned vehicle runs as far as possible along the road without a behavior that the unmanned vehicle leaves a lane and causes a deviation.

It should be noted that an execution sequence of the foregoing steps 1 to 3 is not limited in this embodiment, and each step may be implemented in any sequence.

Step 402. The artificial intelligence device performs, based on the state space, the action space, and the reward function, model training using the reinforcement learning algorithm, to obtain a control model.

In this embodiment, the control model is used to output M-dimensional discrete decisions in action space A based on an input N-dimensional state in state space S. For a specific model training process, the artificial intelligence device may obtain a state $S_t$ of N dimensions when performing $t^{th}$ learning, $S_t$ is an N-dimensional state vector in N-dimensional state space and calculated using a reward function R, to obtain a reward value $R_{t-1}$, $S_t$ is output to a current control model, to obtain an output $A_t$, after $A_t$ is executed, $S_{t+1}$ and $R_t$ are obtained, $S_t$ and $R_{t-1}$ are added into an empirical pool, model training is performed using data in the empirical pool, to update the control model such that subsequent learning can be performed based on an updated control model.

For a process of obtaining states of N dimensions, the artificial intelligence device may be configured with various components such as a camera, various sensors, and a network communications module. The artificial intelligence device may perceive, using the components, a state of an external environment and a state of the artificial intelligence device. For example, the artificial intelligence device may collect a front image using a front-facing camera, and the front image is used to perceive a state of a front environment. For another example, the artificial intelligence device may collect, using an ultrasound radar, a distance between the artificial intelligence device and a surrounding object, to perceive a distance between the artificial intelligence device and an obstacle. For another example, the artificial intelligence device may perceive, using an acceleration sensor, acceleration and a speed that are of the artificial intelligence device. For another example, the artificial intelligence device may perceive, using a gyroscope, an angle of rotation of the artificial intelligence device. For another example, the artificial intelligence device may obtain, using a Global Positioning System (GPS) sensor, road traffic network data, vehicle location information, and the like, to perceive a distance between the artificial intelligence device and a central axis of a road, an included angle between an orientation of the artificial intelligence device and an orientation of the road, and the like.

An unmanned vehicle is used as an example. In a driving process, a GPS sensor may collect location information, and the unmanned vehicle may determine, based on the location information, a current orientation of the unmanned vehicle and an orientation of a central axis of a current driving road, and may calculate, based on the two orientations, an included angle between a central axis of the unmanned vehicle and a central axis of a road. In addition, the unmanned vehicle may calculate, based on the location information, a distance P between the unmanned vehicle and the central axis of the road. In addition, in the driving process, the acceleration sensor may collect acceleration, and the unmanned vehicle may calculate a speed V of the unmanned vehicle based on the acceleration.

In a possible design, an exploration policy may be used for exploration in a reinforcement learning process: The $t^{th}$ learning is used as an example, an action may be executed at a specific probability and based on $A_t$ determined by a reward value $R_{t-1}$, and an action is randomly executed at a specific probability, to enhance generalization of the control model, train a capability to explore an unknown environment by the control model, and ensure that the control model can cope with a complex and changeable actual situation in an actual use process. The exploration policy may be a c-greedy policy, an optimistic initial estimation policy, an attenuation c-greedy policy, an uncertain behavior priority exploration policy, a probability matching policy, an information value policy, or the like. This is not limited in this embodiment.

A first point that should be noted is as follows. For a design that the action space A is discretized into q actions in the foregoing step 401, in step 402, when the training model is used for training based on discrete action space, only one action needs to be selected from the q actions for each learning and may be used as an output discrete decision. Therefore, the training model can perform fast convergence with relatively small exploration space.

A second point that should be noted is as follows. During model training, the model may be trained in a virtual simulator environment, or the model may be trained in a real environment. For example, the unmanned vehicle may run, using an electronic device, simulation software to construct a simulator environment, and the control model may be understood as a process or a thread that runs in the simulator environment. By continuously performing simulation driving in the simulator environment, the control model is continuously mature until training is completed. Alternatively, the unmanned vehicle may run in the real environment, and it is required that the real environment be a multi-lane real road with lane lines, and other mobile vehicles running on a road provide an opportunity for the unmanned vehicle to change a lane, and the other mobile vehicles be arranged at specific randomness, to ensure that a model can be trained based on various datasets in order to enhance a generalization capability of the model.

A third point that should be noted is as follows In this embodiment, a quantity of episodes of model training, a stop rule of model training, and a specific calculation manner of model training may be determined based on an actual requirement. The episode is a process of completing a preset action, and the stop rule is a rule that triggers stop of model training, for example, stop upon completion of one round of model training, or stop upon arrival to a destination. A specific algorithm of model training may include a deep reinforcement learning (DQN) algorithm, a reinforcement learning (Q-learning) algorithm, and the like. In implementation, the DQN algorithm may be used when the quantity of dimensions of state space is relatively large, and the Q-learning algorithm may be used when the quantity of dimensions of state space is relatively small. This is not limited in this embodiment.

A fourth point that should be noted is as follows. For a solution in a related art in which a high-level decision model is trained using a convolutional neural network, in this embodiment, a process of training the control model using the reinforcement learning algorithm has the following technical effects.

First, the control model has a bottom control capability.

In the related art, during driving by human, a large quantity of first angle-of-view images and annotation data of a corresponding steering angle are obtained, a mapping function that is of a first angle-of-view image and that is from the first angle-of-view image to the steering angle is learned based on the convolutional neural network such that the unmanned vehicle determines, during actual driving, the steering angle based on a first angle-of-view image collected in real time and a mapping function. However, currently, for the steering angle determined in the solution, only a degree of a high-level decision such as a steering angle can be reached, but a degree of bottom control such as determining a left turning speed, a right turning speed, a left turning acceleration, and a right turning acceleration cannot be reached. However, in this embodiment, action space of each dimension is designed and may be further refined into a plurality of discrete actions such that an action of a control model decision may be bottomed, clearly defined, and concretized, and therefore, the control model has a bottom control capability. To be specific, a discrete decision output by the control model can indicate a specific action of each dimension, for example, a value accurate to acceleration and a foot lifting value. In this case, accuracy of the decision is improved and practicability is high.

Second, the control model has strong robustness.

In the related art, because the first angle-of-view images are closely related to a vehicle and a road, a mapping function has a poor generalization capability. The mapping function is only used to control a case in which a vehicle that photographs first angle-of-view images during learning runs, and when another vehicle runs in actual application, reliability of a steering angle determined by the mapping function is very low. In addition, the mapping function is applicable only to a road in which a vehicle that photographs first angle-of-view images during learning is located, in actual application, when the vehicle runs on another road, reliability of a steering angle determined by the mapping function is also very low. Therefore, it is difficult to cope with a complex and changeable road situation using this method, and this method is not applicable to another vehicle and has poor robustness.

However, in the method provided in this embodiment, because the control model is used for training using a state of a bottom layer as an input, universality of the state of the bottom layer is strong, and the state of the bottom layer is weakly related to an autonomous body with a collection state and an environment of the autonomous body, to ensure that a decision made for a determined state is applicable to various autonomous bodies and environments. The unmanned vehicle is used as an example. It is not required that a vehicle applied to an actual use process be the same as a vehicle applied to a learning process, and further, it is not required that a road applied to the actual use process is the same as a road applied to the learning process. A decision made in the actual use process is applicable to various vehicles and roads, to ensure that the unmanned vehicle can cope with a complex and changeable road situation, and consequently, this method has strong robustness.

In conclusion, a control model that uses a current state as an input and uses a discrete decision as an output may be obtained through the foregoing steps 401 to 402. In the following steps 403 to 405, based on the foregoing control model, the state space S can be divided into a plurality of disjoint fuzzy subsets $\{S_i\}$, and therefore, all states of each fuzzy subset $S_i$ correspond to a same discrete decision $a_i$ based on the control model, and a corresponding membership function is generated for each fuzzy subset.

Step 403. For each of N dimensions, the artificial intelligence device divides state space of each dimension into a plurality of state intervals.

Based on a granularity, the $i^{th}$ dimension (i=1, . . . n) of N-dimensional state space S may be divided into $m_i$ state intervals. Optionally, the state space of each dimension may be divided in an over-partitioning manner, to be specific, a maximum quantity of state intervals that need to be obtained through division is required, and each state interval is required to be as narrow as possible, to ensure accuracy of a subsequently obtained fuzzy subset. In addition, subsequently, a typical discrete decision of each state interval is obtained based on a central value of each state interval. When the state intervals are obtained through division, central values $s_{ij}$, j=1, . . . $m_i$ of all state intervals may be recorded, to obtain a central value set of state space of all dimensions.

For example, θ-dimensional state space can be divided into M state intervals $\{\Theta_t^1, \Theta_t^2, \ldots \Theta_t^M\}$, and a central value $\theta_t^i$ of the $i^{th}$ state interval $\Theta_t^i$ may be recorded, to obtain a central value set including M central values $\{\theta_t^1, \theta_t^2, \ldots \theta_t^M\}$. It is assumed that the θ-dimensional state space is [−1, 1] and M is equal to 200, the set of central values is {−0.995, 0.985, −0.975, . . . , 0.985, 0.995}.

Step 404. The artificial intelligence device obtains, based on the control model, a typical discrete decision of each of a plurality of state intervals, to obtain a plurality of typical discrete decisions.

A typical discrete decision of a state interval is a discrete decision that is most likely output by the control model when a central value of the state interval is used as an input of the control model, namely, a discrete decision with a maximum output probability. The artificial intelligence device obtains, based on the control model, the typical discrete decision of each state interval, to subsequently obtain a fuzzy subset by combining state intervals with a same typical discrete decision. A process of obtaining the typical discrete decision may include the following steps 1 to 3.

Step 1: For each of the plurality of state intervals, obtain a plurality of representative states of the state interval, where each representative state includes a central value of a state interval of a dimension and a state of another dimension.

A representative state of a state interval is a state in which a value of a dimension of the state interval is a central value of the state interval and the dimension is equal to a dimension of state space, the representative state is used to make a typical discrete decision corresponding to the state interval, the representative state includes the central value of the state interval and the state of the other dimension, and the state of the other dimension may be a sampling value of state space of another dimension.

For example, a representative state of the $j^{th}$ state interval of the $i^{th}$ dimension is obtained. A process of obtaining the representative state may include steps (1) to (2).

(1) Sample state space of another dimension other than the $i^{th}$ dimension in the N dimensions, to obtain a plurality of sampling values.

A sampling manner may be Monte Carlo sampling, and the sampling value is a random sampling value, alternatively, the sampling manner is equal-interval sampling, sampling with a prior probability, or the like. A quantity of sampling values may be determined based on an actual requirement. To ensure accuracy, a maximum quantity of sampling values may be required, for example, 10000 sampling values. The sampling manner and the quantity of sampling values are not limited in this embodiment.

(2) For each of the plurality of sampling values, the sampling value and the central value of the state interval constitute an N-dimensional vector as a representative state of the state interval. A value of the N-dimensional vector in the $i^{th}$ dimension is $s_{ij}$, and a value of the N-dimensional vector in another dimension other than the $i^{th}$ dimension is a sampling value of state space of the other dimension.

Optionally, sampling may be performed once to all state intervals of each dimension, and a representative state of each state interval of the dimension is determined using a sampling value. When the representative state of each state interval of the $i^{th}$ dimension is obtained, state space of each of other dimensions other than the $i^{th}$ dimension in the N-dimensional state space is sampled, to obtain a sampling value of state space of all dimensions other than the $i^{th}$ dimension in the N-dimensional state space, m central values in the central value set are combined with sampling values of state space of all dimensions other than the $i^{th}$ dimension, to obtain m representative states corresponding to the m central values, that is, representative states of all state intervals of the $i^{th}$ dimension are obtained. Therefore, it is ensured that sampling is performed once in the $i^{th}$ dimension, and sampling does not need to be performed to m state intervals for m times.

For example, a representative state of each state interval of θ-dimensional state space is obtained, it is assumed that there are w random sampling points, dimensions other than the θ dimension in state space S are denoted as $S^O$, and w points may be randomly sampled in the state space $S^O$, to obtain these sampling values $\{S^{O1}, S^{O2}, \ldots S^{Ow}\}$. All central values $θ^i$ (i=1, ..., M) in the central value set $\{θ_t^1, θ_t^2, \ldots θ_t^M\}$ of the θ dimension and all sampling values) $\{S^{O1}, S^{O2}, \ldots S^{Ow}\}$ are combined to obtain w representative states $\{S^{i1}, S^{i2}, \ldots S^{iw}\}$, and any representative state is $S^{ij}=(θ^i, S^{Oj})$. $S^{ij}$ and state space S have the same quantity of dimensions.

Step 2: Respectively input a plurality of representative states into the control model to obtain a plurality of discrete decisions output by the control model.

Each of the w representative states may be input into the control model. A corresponding discrete decision may be output from the control model based on the input representative states, and w discrete decisions may be obtained using the w representative states.

Step 3: Select, from the plurality of discrete decisions, a discrete decision with a maximum quantity of repetitions as a typical discrete decision of a state interval.

In a process of obtaining a discrete decision, a quantity of repetitions of each discrete decision may be counted, to select a discrete decision with a maximum quantity of repetitions as a typical discrete decision of a state interval.

For example, a typical discrete decision of $Θ_t^i$ in a θ-dimensional state interval $\{Θ_t^1, Θ_t^2, \ldots, Θ_t^M\}$ is obtained, when w discrete decisions are obtained using w representative states of $Θ_t^i$, a decision with a maximum quantity of repetitions in the w discrete decisions may be counted, used as a typical discrete decision of $Θ_t^i$, and denoted as $A_i$.

405. The artificial intelligence device combines, based on the plurality of typical discrete decisions, a plurality of adjacent state intervals corresponding to a same typical discrete decision into a fuzzy subset, to obtain at least one fuzzy subset of each dimension.

For state space of each dimension, after a plurality of state intervals of the dimension and a plurality of corresponding typical discrete decisions of the dimension are obtained, a change situation of a typical discrete decision may be analyzed, to obtain an edge location on which the typical discrete decision changes in the state intervals. Division is performed once at the edge location each time the edge location is determined, and therefore, a plurality of state intervals in which a typical discrete decision does not change are combined into a fuzzy subset, and the state space of the dimension is further divided into at least one fuzzy subset, where each of the fuzzy subsets corresponds to a same discrete decision, and adjacent fuzzy subsets correspond to different typical discrete decisions.

For example, the artificial intelligence device is a robot. It is assumed that state space of a body action dimension includes 100 state intervals, a typical discrete decision corresponding to state intervals 1 to 10 is squatting, a typical discrete decision corresponding to state intervals 10 to 40 is standing, a typical discrete decision corresponding to state intervals 40 to 80 is hand raising, and a typical discrete decision corresponding to state intervals 80 to 100 is jumping. When analysis is performed based on the change situation of the typical discrete decision, it is determined that the typical discrete decision changes in the state interval 10, the state interval 40, and the state interval 80, to be specific, the edge location is the state interval 10, the state interval 40, and the state interval 80, the state intervals 1 to 10 are combined into a fuzzy subset, the state intervals 10 to 40 are combined into a fuzzy subset, the state intervals 40 to 80 are combined into a fuzzy subset, and the state intervals 80 to 100 are combined into a fuzzy state subset.

For example, the artificial intelligence device is an unmanned vehicle. It is assumed that a state interval $\{Θ_t^1,$ $\Theta_t^2, \ldots, \Theta_t^M\}$ and a corresponding discrete decision set $\{A_1, \ldots A_M\}$ are obtained based on θ-dimensional state space, adjacent state intervals corresponding to a same typical discrete decision are combined to obtain a plurality of new state intervals $\{\overline{\Theta}_t^1, \overline{\Theta}_t^2, \ldots, \overline{\Theta}_t^{k_\theta}\}$ that are denoted as a fuzzy subset, where $k_\theta$ is the number of θ-dimensional fuzzy subsets. Therefore, this completes division of the θ-dimensional fuzzy subsets.

Further, the foregoing describes a process of dividing state space of a dimension into a plurality of fuzzy subsets. In implementation, the state space of each dimension may be divided using this method, to obtain a fuzzy subset of state space of each dimension. For example, the artificial intelligence device is an unmanned vehicle, V-dimensional state space may be divided to obtain a V-dimensional fuzzy subset $\{V^1, V^2, \ldots V^{k_v}\}$, and P-dimensional state space may be divided to obtain a P-dimensional fuzzy subset $\{\overline{P}^1, \overline{P}^2, \ldots \overline{P}^{k_p}\}$, where $k_v$ is the number of V-dimensional fuzzy subsets, and $k_p$ is the number of P-dimensional fuzzy subsets.

In conclusion, the state space of each dimension is divided into a plurality of fuzzy subsets through the foregoing steps 403 to step 405. In this manner of dividing the fuzzy subsets, the following technical effects can be achieved.

Related technologies usually depend on expertise, and fuzzy subsets are obtained through manual division. When state space of a dimension is divided into a plurality of fuzzy subsets, a plurality of experts need to be invited, each expert manually fills out, based on personal experience, decisions in different states, and states corresponding to a same decision are combined into a fuzzy subset. This manner is very complex, less efficient, and less accurate. Further, it is difficult to apply this method to a scenario in which high-dimensional state space is divided into a fuzzy subset A state vector of the high-dimensional state space is already an arrangement and combination of states of different dimensions and therefore represents a very complex actual running condition, an expert cannot make a decision based on personal experience. Therefore, for this method, practicability is relatively low and an application scope is narrow.

However, this embodiment provides a manner of automatically obtaining a fuzzy subset through division using a control model obtained through training based on reinforcement learning. The manner does not need to depend on artificial making of a decision, and therefore, the manner is highly efficient. Further, in an over-partitioning manner, each state space may be divided into a large quantity of state intervals, and when a fuzzy subset is obtained through combination based on a typical discrete decision of a large quantity of state intervals, because a boundary of the fuzzy subset is very accurate, relatively high accuracy of the fuzzy subset can be ensured. Further, the manner is applicable to a scenario in which the high-dimensional state space is divided into fuzzy subsets, and a fuzzy subset may be conveniently and quickly extended to the high-dimensional space. Therefore, the manner is applied to a complex running situation in actual application and is highly practical.

Step 406. The artificial intelligence device obtains, based on a preset rule, a membership function of each fuzzy subset, where the membership function is used to calculate a membership degree of a corresponding fuzzy subset, and the preset rule is that a central value of the membership function in each fuzzy subset is set to one, a membership degree of a boundary value in each fuzzy subset is set to 0.5, and a central value of two adjacent fuzzy subsets in all the fuzzy subsets is set to zero.

Figure 5:
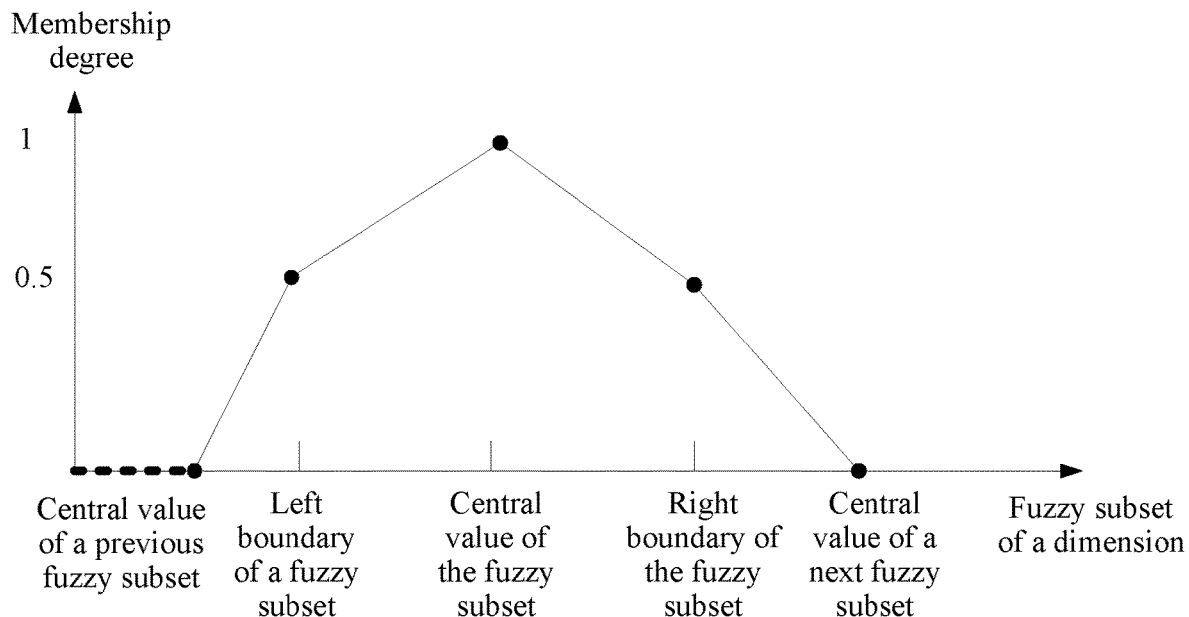
FIG. 5 is a schematic diagram of a membership function according to an embodiment of the present disclosure.

For a manner of obtaining a membership function of a fuzzy subset, five points of the fuzzy subset are determined for each fuzzy subset of each dimension. A central value of the fuzzy subset, a left boundary value of the fuzzy subset, a right boundary value of the fuzzy subset, a central value of a previous fuzzy subset of the fuzzy subset, and a central value of a latter fuzzy subset of the fuzzy subset, a membership degree of the central value is one, a membership degree of the left boundary value and a membership degree of the right boundary value are 0.5, and a membership degree of a central value of the previous fuzzy subset and a membership degree of a central value of the latter fuzzy subset are zero. A piecewise linear function is obtained by connecting adjacent points of the five points to a straight line, and is used as a membership function of the fuzzy subset. A membership function of the fuzzy subset may be shown in FIG. 5.

Figure 6:
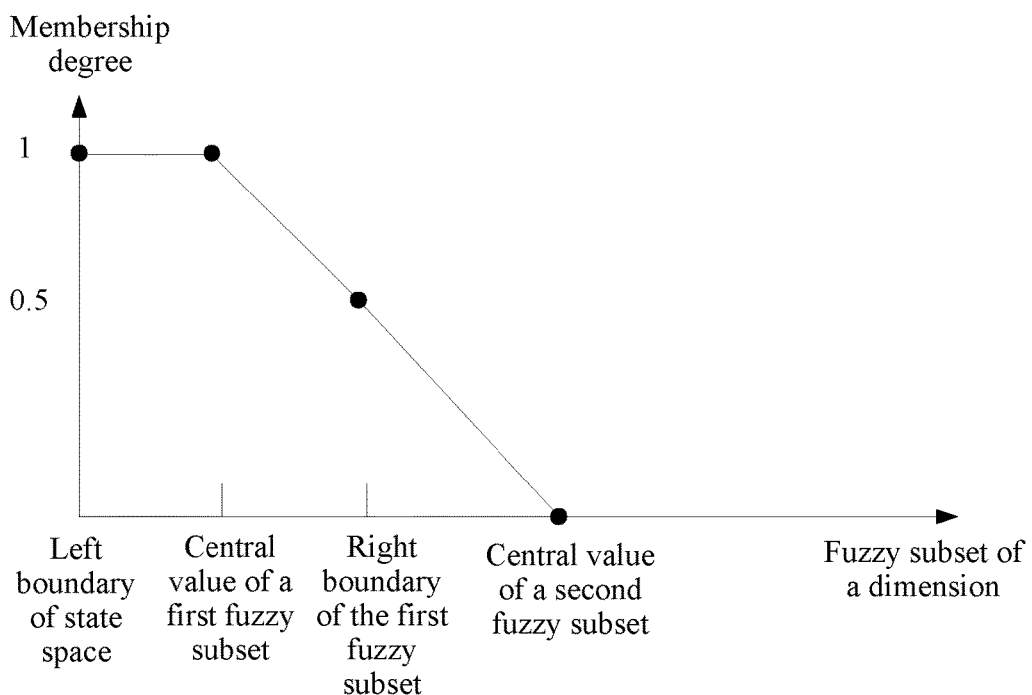
FIG. 6 is a schematic diagram of a membership function according to an embodiment of the present disclosure.
Figure 7:
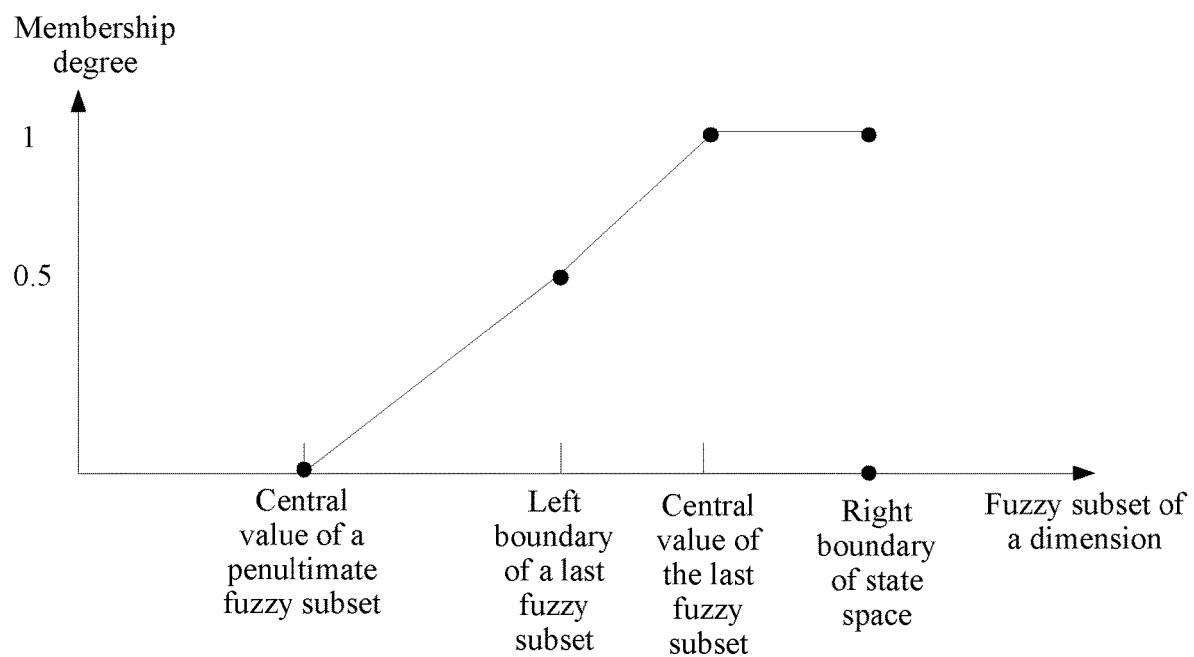
FIG. 7 is a schematic diagram of a membership function according to an embodiment of the present disclosure.

Further, for the first fuzzy subset and the last fuzzy subset that are of any dimension, only four points need to be determined because the two fuzzy subsets includes only one adjacent fuzzy subset. Refer to FIG. 6. For the first fuzzy subset of a dimension, a left boundary value of the state space of the dimension, a central value of the fuzzy subset, a right boundary value of the fuzzy subset, and a central value of the latter fuzzy subset of the fuzzy subset may be determined, a membership degree of the left boundary value of the state space and a membership degree of the central value of the fuzzy subset are one, a membership degree of the right boundary value of the fuzzy subset is 0.5, and the central value of the latter fuzzy subset is zero. A piecewise linear function is obtained by connecting adjacent points of four points to a straight line, and is used as a membership function of the first fuzzy subset. Refer to FIG. 7. For the last fuzzy subset of a dimension, a right boundary value of the state space of the dimension, a central value of the fuzzy subset, a left boundary value of the fuzzy subset, and a central value of the previous fuzzy subset of the fuzzy subset may be determined, a membership degree of the right boundary value of the state space and a membership degree of the central value of the fuzzy subset are one, a membership degree of the left boundary value of the fuzzy subset is 0.5, and the central value of the previous fuzzy subset is zero. A piecewise linear function is obtained by connecting adjacent points of four points to a straight line, and is used as a membership function of the last fuzzy subset.

The following technical effects can be achieved in this manner of constructing a membership function.

First, the membership function is highly explanatory and relatively effective. When a state of a dimension is a central value of a fuzzy subset, a person generally gives, based on a subjective perception, an evaluation that the state strongly belongs to the fuzzy subset, when the state is calculated using the membership function of the fuzzy subset, a membership degree between the obtained state and the fuzzy subset is one, to reach a maximum membership degree, thereby accurately representing a degree that the state strongly belongs to the fuzzy subset. When a state of a dimension is a boundary value of a fuzzy subset, a person generally gives, based on a subjective perception, a fuzzy evaluation that the state probably belongs to the fuzzy subset, and may also belong to a fuzzy subset adjacent to the fuzzy subset, when the state is calculated using the membership function of the fuzzy subset, a membership degree between the obtained state and the fuzzy subset is 0.5, and a membership degree between the state and the fuzzy subset adjacent to the fuzzy subset is also 0.5, and the membership degree is equal to each other, thereby accurately representing a degree that the state probably belongs to the fuzzy subset. When a state of a dimension is a central value of a fuzzy subset adjacent to a fuzzy subset, a person usually gives, based on the subjective perception, an evaluation that the state weakly belongs to the fuzzy subset, when the state is calculated using the membership function of the fuzzy subset, a membership degree between the obtained state and the fuzzy subset is zero, thereby accurately representing a degree that the state weakly belongs to the fuzzy subset. To be specific, it is ensured that a membership degree that is obtained through calculation using the membership function and that is of a state matches a membership degree obtained through man-made evaluation, to properly and accurately represent a degree that the state belongs to the fuzzy subset.

Second, steps are simple, and efficiency of constructing a membership function can be improved. In a related art, a membership function is usually constructed in a curve fitting manner. A large quantity of samples are collected in advance, an approximate curve of the membership function is drawn, a membership function that matches the curve is determined from a plurality of typical membership functions such as parabolic distribution and trapezoidal distribution, and a coefficient of the membership function is adjusted to approximate a sample, to obtain the membership function of the fuzzy subset. This manner is relatively complex and less efficient. In this embodiment, only five points need to be selected for each fuzzy subset, and the membership function can be obtained through value assignment and connection. Therefore, a speed of constructing the membership function is relatively high, and efficiency is improved.

It should be noted that the foregoing description is merely an example for describing a manner of constructing a membership function by drawing a piecewise linear function. In implementation, the membership function may alternatively be constructed in another manner. For example, a common membership function such as a parabolic distribution function, a trapezoidal distribution function, and a triangular distribution function may be obtained in the curve fitting manner, based on the fuzzy subset, curve fitting is performed for the membership function, to obtain a final membership function. Certainly, the membership function may alternatively be constructed in any manner in which the membership function is determined based on the fuzzy subset. This is not limited in this embodiment.

In conclusion, in the foregoing steps 403 to 406, the state space of each dimension is divided into a plurality of fuzzy subsets, and a membership function of each fuzzy subset is obtained. In the following step 407, the artificial intelligence device makes a decision in combination with a fuzzy subset, a membership function, a control model, and a current state that are of each dimension, to control an action of the artificial intelligence device.

Step 407. The artificial intelligence device obtains states of the N dimensions.

This step is similar to a process in which the state is obtained when the model is trained in the foregoing step 402, and details are not described herein.

Step 408. The artificial intelligence device obtains a plurality of discrete decisions based on an active fuzzy subset and a control model that are of a state of each of the N dimensions, where an active fuzzy subset of a state is a fuzzy subset whose membership degree of the state is not zero, and the control model is used to output a corresponding discrete decision based on an input state.

For each of the N dimensions, the artificial intelligence device obtains, based on a state of each dimension, at least one active fuzzy subset of a plurality of fuzzy subsets of each dimension, to obtain an active fuzzy subset of the N dimensions. A plurality of discrete decisions can be obtained based on the active fuzzy subsets and the control model, each of the discrete decisions is a decision that can be considered for the determined state of the N dimensions, and subsequently weighted summation is performed on the discrete decisions, to obtain a continuous decision.

A specific process of obtaining an active fuzzy subset of each dimension may include the following two possible designs.

Design 1: For each of the N dimensions, when a membership degree of a fuzzy subset of each dimension is not zero, the fuzzy subset is used as an active fuzzy subset of each dimension.

For each fuzzy subset of each of the N dimensions, a membership function corresponding to each fuzzy subset may be used to calculate a state of the dimension, to obtain a membership degree of each fuzzy subset. When the membership degree is not zero, the fuzzy subset is used as an active fuzzy subset. To be specific, a fuzzy subset may be obtained and used as the active fuzzy subset, where the membership degree of the fuzzy subset in divided fuzzy subsets in all dimensions is not zero.

Further, after the artificial intelligence device obtains states $S=(s_1, \ldots s_n)$ of the N dimensions in an actual running process, a membership degree between each dimension S and each fuzzy subset is calculated using the membership function of each fuzzy subset of the dimension obtained in the foregoing step 406, where a fuzzy subset whose membership degree is not zero is an active fuzzy subset. For example, it is assumed that θ-dimensional state space includes five fuzzy subsets and five membership functions, θ may be calculated using the five membership functions after being obtained, to obtain a membership degree between θ and each of the five fuzzy subsets. A fuzzy subset whose membership degree is not zero is selected from the five fuzzy subsets and used as a θ-dimensional active fuzzy subset. Based on a design principle of the foregoing membership function, it can be learned that there are no more than two active fuzzy subsets in any dimension.

Design 2: For each of the N dimensions, two fuzzy subsets are selected from the plurality of fuzzy subsets of each dimension and used as active fuzzy subsets of each dimension, where central values of the two fuzzy subsets are around the state of the dimension.

After the artificial intelligence device obtains states $S=(s_1, \ldots s_n)$ of the N dimensions in an actual running process, for each dimension S, a central value of a fuzzy subset on the left side of S can be found in the central value set of the fuzzy subset corresponding to the dimension, namely, a central value that is less than S, in the central values of all fuzzy subsets, and closest to S. A fuzzy subset including the central value is used as an active fuzzy subset. Similarly, a central value of a fuzzy subset on the right side of S is found in a central value set of fuzzy subsets corresponding to the dimension, namely, a central value that is greater than s, in the central values of all fuzzy subsets, and closest to s. Fuzzy subsets including the central value are used as active fuzzy subsets. By analogy, two active fuzzy subsets are obtained for each dimension, and n pairs of active fuzzy subsets can be obtained for N dimensions.

For example, obtained states of the N dimensions are $S=(\theta, V, P)$, $(\overline{\theta}^i, \overline{\theta}^{i+1})$ closest to θ may be found in a θ-dimensional central value set, $(\overline{v}^j, \overline{v}^{j+1})$ closest to V may be found in a V-dimensional central value set, $(\overline{p}^k, \overline{p}^{k+1})$ closest to P may be found in a P-dimensional central value set, to be specific, three pairs of central values of the active fuzzy subsets are found for each dimension: $(\overline{\theta}^i, \overline{\theta}^{i+1})$, $(\overline{v}^j, \overline{v}^{j+1})$ and $(\overline{p}^k, \overline{p}^{k+1})$. The active fuzzy subsets include $\overline{\theta}^i$, $\overline{\theta}^{i+1}$, $\overline{v}^j$, $\overline{v}^{j+1}$, $\overline{p}^k$, and $\overline{p}^{k+1}$.

After active fuzzy subsets of the N dimensions are obtained, a plurality of discrete decisions may be obtained based on the active fuzzy subsets. A process of obtaining a discrete decision may include the following steps 1 to 3.

Step 1: Obtain a central value of an active fuzzy subset corresponding to a state of each dimension, to obtain a plurality of central values.

Step 2: Combine central values of different dimensions to obtain a plurality of intermediate states, where each intermediate state includes central values of the N dimensions.

For the $i^{th}$ dimension in the N dimensions, a central value may be selected from a central value of at least one active fuzzy subset of the $i^{th}$ dimension. After the N dimensions are traversed, N central values are selected and then combined to obtain an intermediate state. The intermediate state includes N dimensions, and a value of any dimension is a central value of an active fuzzy set of the dimension.

For example, when each dimension corresponds to two active fuzzy sets, a plurality of obtained n-dimensional intermediate states may be represented as $\{(s_{1,k_1+x_1}, \ldots s_{n,k_n+x_n}), x_i = 0 \text{ or } 1\}$. $s_{i,k_i+x_i}$ is a central value of the active fuzzy subset when $s_i$ is in the $i^{th}$ dimension. For example, it is assumed that the states of the N dimensions are $S=(\theta, V, P)$, central values of fuzzy subsets of three dimensions are combined to obtain eight 3-dimensional states that may be represented as $\{S=(\overline{\theta}^{i+x}, \overline{v}^{j+y}, \overline{p}^{k+z}), x,y,z=0, 1\}$.

Step 3: Respectively input a plurality of intermediate states into the control model to obtain a plurality of discrete decisions output by the control model.

After a plurality of N-dimensional intermediate states are obtained, any N-dimensional intermediate state is input to the control model, and the control model may output a discrete decision of the N-dimensional intermediate state. For example, $\{S_r=(\overline{\theta}^{i+x}, \overline{v}^{j+y}, \overline{p}^{k+z}), x,y,z=0, 1\}$ is used as an input of the control model, to obtain eight output discrete decisions $\{A_{xyz}, x,y,z=0, 1\}$.

Step 409. The artificial intelligence device performs, based on a membership degree between a state and an active fuzzy subset that are of each dimension, weighted summation on the plurality of discrete decisions, to obtain a continuous decision.

Because a membership function is a continuous function, after weighted summation is performed on the plurality of discrete decisions based on a membership degree that is obtained through calculation using the membership function, an obtained decision is a continuous decision. The artificial intelligence device is controlled to execute an action based on the continuous decision, to ensure smooth control over the artificial intelligence device, and improve smoothness of the action.

A process of obtaining a continuous decision by performing weighted summation on the plurality of discrete decisions may further include the following steps 1 to 3.

Step 1 Obtain, for each of the plurality of discrete decisions, membership degrees of N active fuzzy subsets corresponding to each discrete decision, to obtain N membership degrees.

For a concept of N active fuzzy subsets corresponding to a discrete decision and a process of obtaining the N active fuzzy subsets, for each discrete decision, an intermediate state of the discrete decision may be output in a process of obtaining an output discrete decision obtained by previously inputting an intermediate state to a control model, and then the N active fuzzy subsets of the intermediate state are determined in a process in which central values of a plurality of active fuzzy subsets constitute an intermediate state, and the N active fuzzy subsets are used as the N active fuzzy subsets corresponding to the discrete decision.

After the N active fuzzy subsets are determined, when the artificial intelligence device uses the design 1 in the foregoing step 408, the membership degree of the N active fuzzy subsets may be obtained based on the membership degree that is obtained through calculation in the foregoing process and that is of each fuzzy subset of each dimension, to obtain the N membership degrees. However, when the artificial intelligence device uses the design 2 in the foregoing step 408, for each fuzzy subset of each of the N dimensions, a membership function corresponding to the fuzzy subset may be used to calculate a state of the dimension, to obtain a membership degree of the fuzzy subset and the N membership degrees.

For example, the membership function of the $j^{th}$ active fuzzy subset of the $i^{th}$ dimension is $f_{ij}$, and the membership function of each active fuzzy subset of each dimension is $\{f_{ij}, i=1, \ldots n, j=1, \ldots m_i\}$, to calculate the membership degree between N-dimensional state S and each active fuzzy subset, the membership function between S and the $j^{th}$ active fuzzy subset is equal to $f_{1,k_1+x_1}^{j}(s_1) \times \ldots \times f_{n,k_n+x_n}^{j}(s_n)$.

$S=(\theta, V, P)$ is used as an example. When active fuzzy subsets $\overline{\theta}^i$, $\overline{\theta}^{i+1}$, $\overline{v}^j$, $\overline{v}^{j+1}$, $\overline{p}^k$, and $\overline{p}^{k+1}$ are obtained in the foregoing step 404, a membership function of $\overline{\theta}^i$ may be used to calculate $\theta$ to obtain a membership degree $w_\theta^1$ between $\theta$ and $\overline{\theta}^i$, a membership function of $\overline{\theta}^{i+1}$ is used to calculate $\theta$ to obtain a membership degree $w_\theta^2$ between $\theta$ and $\overline{\theta}^{i+1}$, a membership function of $\overline{v}^j$ is used to calculate V to obtain a membership degree $w_v^1$ between V and $\overline{v}^j$, a membership function of $\overline{p}^k$ is used to calculate V to obtain $w_v^2$ between V and $\overline{v}^{j+1}$, a membership function of $\overline{p}^k$ is used to calculate P to obtain a function degree $w_p^1$ between P and $\overline{p}^{k+1}$, and a membership function of $\overline{p}^{k+1}$ is used to calculate P to obtain a membership degree $w_p^2$ between P and $\overline{p}^{k+1}$.

Step 2: Calculate, based on the N membership degrees, weights of the discrete decisions.

Optionally, the artificial intelligence device may calculate a product of the N membership degrees as the weights of the discrete decisions. For example, it is assumed that a discrete decision is $A_{xyz}$, and the weight of the discrete decision is $w_\theta^x w_v^y w_p^z$.

Step 3: Perform, based on the weights of the discrete decisions, weighted summation on the plurality of discrete decisions, to obtain a continuous decision.

For example, $S=(\theta, V, P)$ corresponds to eight discrete decisions, after weights of the eight discrete decisions are obtained, weighted summation may be performed on the eight discrete decisions based on the weights of the discrete decisions, to obtain a continuous decision $\Sigma_{x,y,z=0,1} w_\theta^x w_v^y w_p^z A_{xyz}$.

Step 410. The artificial intelligence device controls, based on the continuous decision, itself to execute a corresponding action.

The continuous decision may include M dimensions, namely, dimensions of M-dimensional action space A in the foregoing step 401. The artificial intelligence device may obtain a value of the continuous decision in each dimension, and control itself to execute the action of each dimension.

With reference to an actual usage scenario, for example, the artificial intelligence device is an unmanned vehicle. For a continuous decision of a steering angle dimension, the unmanned vehicle rotates at a specific angle based on the continuous decision, for example, the continuous decision of the steering angle dimension is −1, the steering angle dimension is mapped to a maximum angle by which the unmanned vehicle can turn right. In this case, the unmanned vehicle turns right based on the maximum angle, for another example, the continuous decision is zero, the steering angle dimension is mapped to 0°, and the unmanned vehicle runs straight. For a continuous decision of an acceleration dimension, the unmanned vehicle accelerates based on the continuous decision. For example, if the continuous decision of the acceleration dimension is 0.3 and a mapped acceleration is 300 meters per seconds square ($m/s^2$), the unmanned vehicle accelerates at a speed of 300 $m/s^2$. For example, the artificial intelligence device is a robot. For a continuous decision of a left-foot dimension, the robot controls a left-foot action based on the continuous decision. For example, if there are five continuous decisions of the left-foot dimension, the left-foot dimension is mapped to left-foot lifting for 40 centimeters (cm), and the robot lifts the left foot for 40 cm.

A first point that should be noted is as follows That an execution body is an artificial intelligence device is merely used as an example for description in this embodiment. In implementation, an action control method provided in this embodiment may alternatively be executed by a server. The server may be deployed on a cloud, and a network connection may be established between the server and the artificial intelligence device. Using the network connection, the server and the artificial intelligence device perform real-time communication. The artificial intelligence device may send obtained states of all dimensions to the server. The server may obtain a continuous decision based on a state and a control model that are of each dimension, and send the continuous decision to the artificial intelligence device such that the artificial intelligence device may control itself to execute a corresponding action after receiving the continuous decision, and therefore, an effect of remotely controlling the artificial intelligence device to execute an action is achieved. In a process in which the server interacts with the artificial intelligence device, to ensure security, a minimal communication latency and maximal communication security may be required.

A second point that should be noted is as follows. A continuous decision is made using a membership degree between a state and an active fuzzy subset, and this provides a manner of properly and continuously making a decision, to ensure high accuracy of the continuous decision: Because the membership degree can reflect a change trend of the state in a fuzzy interval, with running of the artificial intelligence device, when an obtained value of the state changes with a change trend, a position of the state in the fuzzy subset changes with the change trend, a state position in the fuzzy subset also changes with the change trend, the membership degree of the fuzzy subset also changes with the change trend. A continuous decision made based on the membership degree also changes with the change trend, to be specific, the change trend of the continuous decision matches the change trend of the state, and therefore, accuracy of the manner is high.

According to the method provided in this embodiment, based on a membership degree between a state and an active fuzzy subset that are of each dimension, weighted summation is performed on the plurality of discrete decisions, to obtain a continuous decision. An output decision is a continuous quantity, to ensure smooth control over the artificial intelligence device, and ensure smoothness of an action. In addition, a continuous decision is obtained using a membership degree. This provides a manner of properly and continuously discretizing a decision, to ensure that a change trend of the continuous decision matches that of a state, and ensure that the continuous decision is highly accurate. Further, when the artificial intelligence device is an unmanned vehicle, control smoothness of the unmanned vehicle can be ensured such that passengers feel more comfortable.

Figure 8:
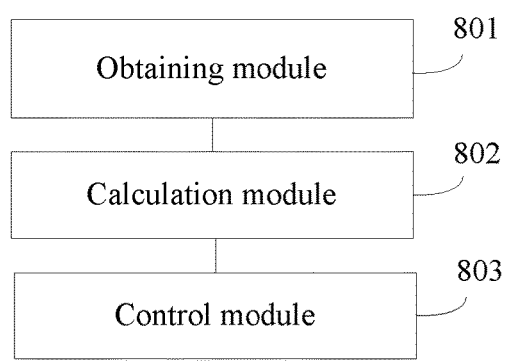
FIG. 8 is a schematic structural diagram of an action control apparatus according to an embodiment of the present disclosure.

FIG. 8 is a schematic structural diagram of an action control apparatus according to an embodiment of the present disclosure. As shown in FIG. 8, the apparatus includes an obtaining module 801, a calculation module 802, and a control module 803.

The obtaining module 801 is configured to perform the foregoing step 407.

The obtaining module 801 is further configured to perform the foregoing step 408.

The calculation module 802 is configured to perform the foregoing step 409.

The control module 803 is configured to perform the foregoing step 410.

In a possible design, the obtaining module 801 includes an obtaining submodule configured to perform step 1 in design 2 of the foregoing step 408, a combination submodule configured to perform step 2 in design 2 of the foregoing step 408, and an input submodule configured to perform step 3 in design 2 of the foregoing step 408.

In a possible design, the apparatus further includes a dividing module configured to perform the foregoing step 401.

The obtaining module 801 is further configured to perform the foregoing step 404.

The obtaining module 801 is further configured to perform the foregoing step 405.

In a possible design, the obtaining module 801 includes an obtaining submodule configured to perform step 1 in the foregoing step 404, an input submodule configured to perform step 2 in the foregoing step 404, and a selection submodule configured to perform step 2 in the foregoing step 404.

In a possible design, the calculation module 802 is configured to calculate a membership degree of each fuzzy subset.

In a possible design, the obtaining module 801 is further configured to perform the foregoing step 406.

All or some of the foregoing embodiments may be implemented by software, hardware, firmware, or any combination thereof. When software is used to implement the embodiments, the embodiments may be implemented completely or partially in a form of a computer program product. The computer program product includes one or more computer program instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired or wireless manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD), a semiconductor medium (for example, a solid-state drive), or the like.

The foregoing are merely optional embodiments of the present disclosure, and are not intended to limit the present disclosure. Any variation or replacement readily figured out by a person skilled in the art within the technical scope disclosed in this application shall fall within the protection scope of this application.

What is claimed is:

1. An action control method comprising:
obtaining states of N dimensions of an artificial intelligence device, wherein N is a positive integer greater than or equal to one;
obtaining a plurality of discrete decisions, based on an active fuzzy subset and a control model, corresponding to a state of each of the N dimensions, wherein the active fuzzy subset is a fuzzy subset comprises a membership degree of the state that is not zero, wherein the fuzzy subset is a state interval that corresponds to a same discrete decision in a dimension, wherein the membership degree indicates a degree that the state belongs to the fuzzy subset, and wherein the control model outputs a corresponding discrete decision based on an input state;
performing, based on a membership degree between a state and an active fuzzy subset that are of each dimension, a weighted summation on the discrete decisions to obtain a continuous decision; and
controlling, based on the continuous decision, the artificial intelligence device to execute a corresponding action.

2. The action control method of claim 1, further comprising:
obtaining, for each of the discrete decisions, membership degrees of N active fuzzy subsets corresponding to each discrete decision to obtain N membership degrees;
calculating, based on the N membership degrees, weights of the discrete decisions; and
performing, based on the weights of the discrete decisions, the weighted summation on the discrete decisions to obtain the continuous decision.

3. The action control method of claim 1, further comprising:
obtaining a central value of an active fuzzy subset of each of the N dimensions to obtain a plurality of central values;
combining central values of the N dimensions to obtain a plurality of intermediate states; and
inputting the intermediate states into the control model to obtain the discrete decisions from the control model.

4. The action control method of claim 1, wherein before obtaining the discrete decisions, the action control method further comprises setting, for each of the N dimensions, each fuzzy subset as an active fuzzy subset of each dimension when the membership degree is not zero.

5. The action control method of claim 1, wherein before obtaining the states of the N dimensions of the artificial intelligence device, the action control method further comprises:
dividing, for each of the N dimensions, a state space of each dimension into a plurality of state intervals;
obtaining, based on the control model, a typical discrete decision of each of the state intervals to obtain a plurality of typical discrete decisions; and
combining, based on the typical discrete decisions, a plurality of adjacent state intervals corresponding to a same typical discrete decision into a fuzzy subset to obtain a fuzzy subset of each dimension.

6. The action control method of claim 5, further comprising:
obtaining, for each of the state intervals, a plurality of representative states of each state interval, wherein each representative state comprises a central value of each state interval of each dimension and any one of other states of each dimension;
respectively inputting the representative states into the control model to obtain the discrete decisions from the control model; and
selecting, from the discrete decisions, a discrete decision with a maximum quantity of repetitions as a typical discrete decision of each state interval.

7. The action control method of claim 1, wherein after obtaining the N dimensions of the artificial intelligence device, the action control method further comprises calculating, for each fuzzy subset of each of the N dimensions, a state of each dimension using a membership function corresponding to each fuzzy subset to obtain a membership degree of each fuzzy subset.

8. The action control method of claim 7, wherein before obtaining the states of the N dimensions of the artificial intelligence device, the action control method further comprises obtaining, based on a preset rule, the membership function of each fuzzy subset, wherein the membership function calculates a membership degree of a corresponding fuzzy subset, and wherein the preset rule is that a central value of the membership function in each fuzzy subset is set to one, a membership degree of a boundary value in each fuzzy subset is set to 0.5, and a central value of two adjacent fuzzy subsets in all the fuzzy subsets is set to zero.

9. The action control method of claim 1, wherein before obtaining the discrete decisions, the action control method further comprises selecting, for each of the N dimensions, two fuzzy subsets as active fuzzy subsets of each dimension from a plurality of fuzzy subsets of each dimension, and wherein central values of the two fuzzy subsets are around the state of each of the N dimensions.

10. An action control device comprising:
a non-transitory medium configured to store program instructions; and
a processor coupled to the a non-transitory medium, wherein the program instructions cause the processor to be configured to:
obtain states of N dimensions of an artificial intelligence device, wherein N is a positive integer greater than or equal to one;
obtain a plurality of discrete decisions based on an active fuzzy subset and a control model corresponding to a state of each of the N dimensions, wherein the active fuzzy subset is a fuzzy subset comprises a membership degree of the state that is not zero, wherein the fuzzy subset comprises a state interval that corresponds to a same discrete decision in a dimension, wherein the membership degree indicates a degree that the state belongs to the fuzzy subset, and wherein the control model outputs a corresponding discrete decision based on an input state;
perform, based on a membership degree between a state and an active fuzzy subset that are of each dimension, a weighted summation on the discrete decisions, to obtain a continuous decision; and control, based on the continuous decision, the artificial intelligence device to execute a corresponding action.

11. The action control device of claim 10, wherein the program instructions further cause the processor to be configured to:
obtain, for each of the discrete decisions, membership degrees of N active fuzzy subsets corresponding to each discrete decision to obtain N membership degrees;
calculate, based on the N membership degrees, weights of the discrete decisions; and
perform, based on the weights of the discrete decisions, the weighted summation on the discrete decisions to obtain the continuous decision.

12. The action control device of claim 10, wherein the program instructions further cause the processor to be configured to:
obtain a central value of an active fuzzy subset of each of the N dimensions to obtain a plurality of central values;
combine central values of the N dimensions to obtain a plurality of intermediate states; and
respectively input the intermediate states into the control model to obtain the plurality of discrete decisions from the control model.

13. The action control device of claim 10, wherein the program instructions further cause the processor to be configured to set, for each of the N dimensions, each fuzzy subset as an active fuzzy subset of each dimension when a membership degree between a state and any fuzzy subset that are of each dimension is not zero.

14. The action control device of claim 10, wherein the program instructions further cause the processor to be configured to:
divide, for each of the N dimensions, a state space of each dimension into a plurality of state intervals;
obtain, based on the control model, a typical discrete decision of each of the plurality of state intervals to obtain a plurality of typical discrete decisions; and
combine, based on the typical discrete decisions, a plurality of adjacent state intervals corresponding to a same typical discrete decision into a fuzzy subset to obtain a fuzzy subset of each dimension.

15. The action control device of claim 14, wherein the program instructions further cause the processor to be configured to:
obtain, for each of the state intervals, a plurality of representative states of each state interval, wherein each representative state comprises a central value of each state interval of each dimension and any one of other states of each dimension;
respectively input the representative states into the control model to obtain the discrete decisions from the control model; and
select, from the discrete decisions, a discrete decision with a maximum quantity of repetitions as a typical discrete decision of each state interval.

16. The action control device of claim 10, wherein the program instructions further cause the processor to be configured to calculate, for each fuzzy subset of each of the N dimensions, a state of each dimension using a membership function corresponding to each fuzzy subset to obtain a membership degree of each fuzzy subset.

17. The action control device of claim 16, wherein the program instructions further cause the processor to be configured to obtain, based on a preset rule, the membership function of each fuzzy subset, wherein the membership function calculates a membership degree of a fuzzy subset of a corresponding dimension, and wherein the preset rule is that a central value of the membership function in each fuzzy subset is set to one, a membership degree of a boundary value in each fuzzy subset is set to 0.5, and a central value of two adjacent fuzzy subsets in all the fuzzy subsets is set to zero.

18. The action control device of claim 10, wherein the program instructions further cause the processor to be configured to select, for each of the N dimensions, two fuzzy subsets as active fuzzy subsets of each dimension from a plurality of fuzzy subsets of each dimension, and wherein central values of the two fuzzy subsets are around the state of each of the N dimensions.

19. A computer program product comprising computer-executable instructions for storage on a non-transitory computer-readable storage medium that, when executed by a processor, cause an apparatus to:
obtain states of N dimensions of an artificial intelligence device, wherein N is a positive integer greater than or equal to one;
obtain a plurality of discrete decisions based on an active fuzzy subset and a control model corresponding to a state of each of the N dimensions, wherein the active fuzzy subset is a fuzzy subset comprises a membership degree of the state that is not zero, wherein the fuzzy subset is a state interval that corresponds to a same discrete decision in a dimension, wherein the membership degree indicates a degree that the state belongs to the fuzzy subset, and wherein the control model outputs a corresponding discrete decision based on an input state;
perform, based on a membership degree between a state and an active fuzzy subset that are of each dimension, a weighted summation on the discrete decisions to obtain a continuous decision; and
control, based on the continuous decision, the artificial intelligence device to execute a corresponding action.

20. The computer program product of claim 19, wherein the computer-executable instructions further cause the apparatus to:
obtain, for each of the discrete decisions, membership degrees of N active fuzzy subsets corresponding to each discrete decision to obtain N membership degrees;
calculate, based on the N membership degrees, weights of the discrete decisions; and
perform, based on the weights of the discrete decisions, the weighted summation on the discrete decisions to obtain the continuous decision.

* * * * *